Sept. 15, 1970          H. BERTIN          3,528,724

BINOCULAR OBSERVATION AND SIGHTING INSTRUMENTS

Filed June 25, 1964          3 Sheets-Sheet 1

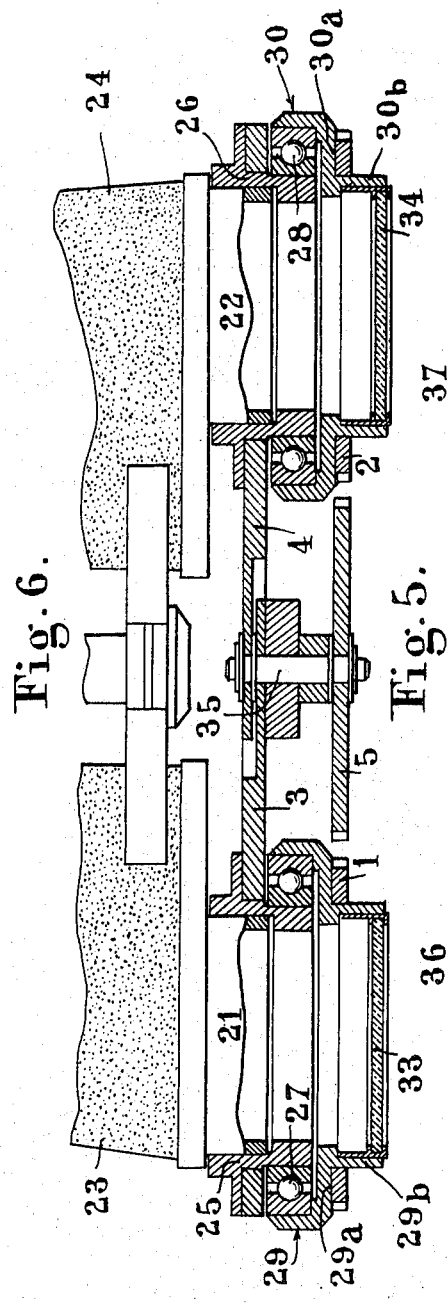

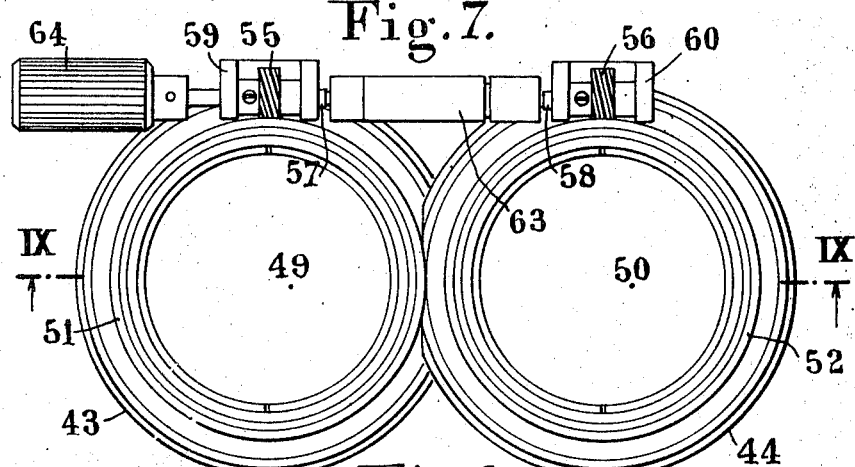
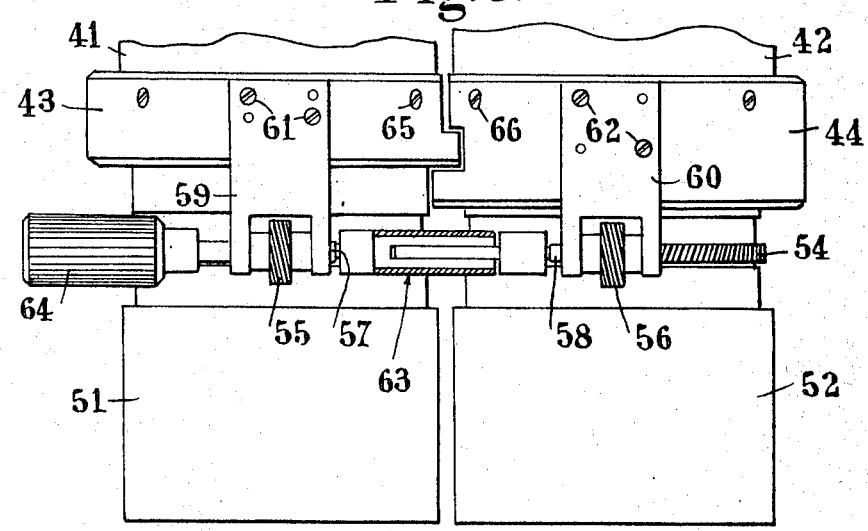
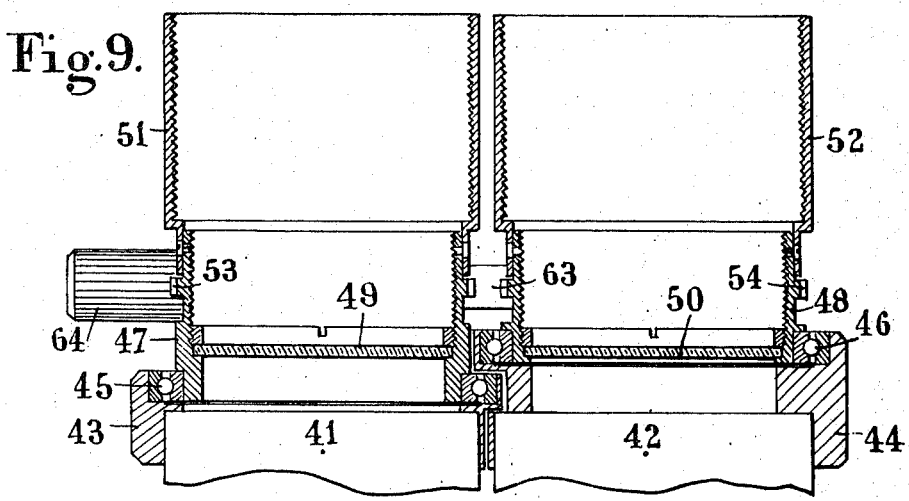

United States Patent Office 3,528,724
Patented Sept. 15, 1970

3,528,724
BINOCULAR OBSERVATION AND SIGHTING INSTRUMENTS
Henri Bertin, Arcueil, France, assignor to Etat Francais (French State), Arcueil, Seine, France
Filed June 25, 1964, Ser. No. 379,439
Int. Cl. G02b 5/30
U.S. Cl. 350—159          7 Claims This invention is concerned with improvements in or relating to binocular observation and sighting instruments.

It is known that the light producing the blue color of the sky is diffused more particularly by the gaseous molecules and is strongly polarized. The same applies to luminous background constituted by the blue color of the sea. This property was discovered by observing a luminous background such as the sky or the sea through a polarizer and by rotating the latter. Thus, it was observed that after passing through the polarizer the luminance of the light rays varied as a function of the degree of rotation or adjustment of the polarizing plane of said polarizer, without any appreciable variation in the color feeling but with a considerable variation in the saturation, in the colorimetric meaning of the term.

It is the essential object of this invention to take advantage of this experimental discovery with a view to improve the contrast between an object and the background against which this object stands out, when this object is sighted through an observation instrument.

To this end, the binocular observation and sighting instrument according to this invention is characterized in that a polarizer is interposed in each optical path, this polarizer being mounted on a movable support adapted to rotate about the optical axis of said path, and that the movable supports of the two polarizers are coupled through a mechanical gearing controlling the rotation of said polarizers by maintaining their polarization planes strictly parallel irrespective of the polarizer adjustment and of the relative spacing of the two optical axes of the instrument.

The observation and sighting instrument according to this invention is advantageous in that, according as the sighted object is more or less brilliant than the background, the luminance contrast between the sighted object and the background can be increased while preserving the advantageous characteristic of color contrast by simply rotating the polarization planes of the two polarizers.

If desired, each polarizer may be completed with a suitable spectral filter with a view to increase the luminance contrast. However, this involves a more or less complete loss of the color contrast. This loss can be avoided only by using selective didyme filters.

In order to afford a clearer understanding of this invention and of the manner in which the same may be carried out in practice, various forms of embodiment thereof will be described hereinafter by way of example with reference to the attached drawings, in which:

FIG. 5 is an end view of the same binoculars as seen from the big end thereof;

FIG. 6 is a section taken along the line VI—VI of FIG. 5;

FIG. 7 is a view similar to FIG. 5 but showing a modified form of embodiment of the mechanical gearing incorporated in a binocular observation and sighting instrument, wherein the two binocular bodies are displaceable by translation in relation to each other;

FIG. 8 is a view from above of the instrument shown in FIG. 7, and

FIG. 9 is a section taken upon the line IX—IX of FIG. 7.

Reference will first be made to the diagrammatic FIGS. 1 to 3 of the drawings showing various mechanical gearings suitable for maintaining in strict parallel relationship the polarization planes $P_1$ and $P_2$ (designated by arrows in these figures) of polarizers interposed respectively in the two optical paths of a binocular observation instrument.

Figure 1:
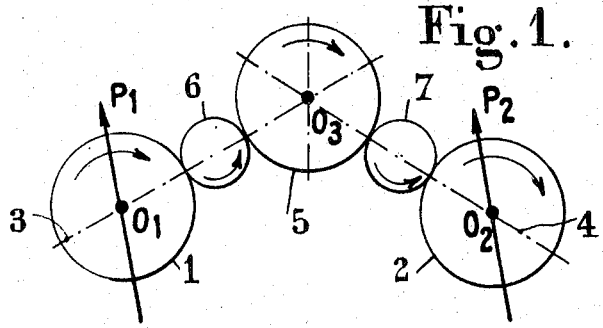
FIG. 1 is a diagram illustrating the principle of a mechanical gearing for maintaining the polarization planes parallel to each other.

In FIG. 1 the polarizers are rotatably solid respectively with toothed wheels 1, 2 adapted to revolve about shafts $O_1$ and $O_2$ carried by arms 3, 4 respectively, shown in chain-dotted lines and both adapted to pivot about a pivot pin $O_3$, the distances between centers $O_1$–$O_3$ and $O_2$–$O_3$ being equals. Another central toothed wheel 5 is mounted for rotation about pivot pin $O_3$ and rotatably connected to the toothed wheels 1, 2 by means of intermediate pinions 6, 7 rotatably mounted in turn on arms 3, 4 respectively. The number of intermediate pinions between the central toothed wheel 5 and each evternal toothed wheel 1, 2 is immaterial, provided that the transmission ratio between the toothed wheels 1 and 2 is 1:1, so that after the parallelism between the polarization planes $P_1$, $P_2$ has been adjusted initially, it is maintained irrespective of the subsequent separate adjustment of a polarizer. On the other hand, due to the symmetrical arrangement of the intermediate pinions 6, 7 on either side of the central wheel 5, there is always an odd number of pinions in the gearing from wheel 1 to wheel 2, and therefore these outer wheels and the polarizers coupled thereto are always driven for rotation in the same direction.

Figure 2:
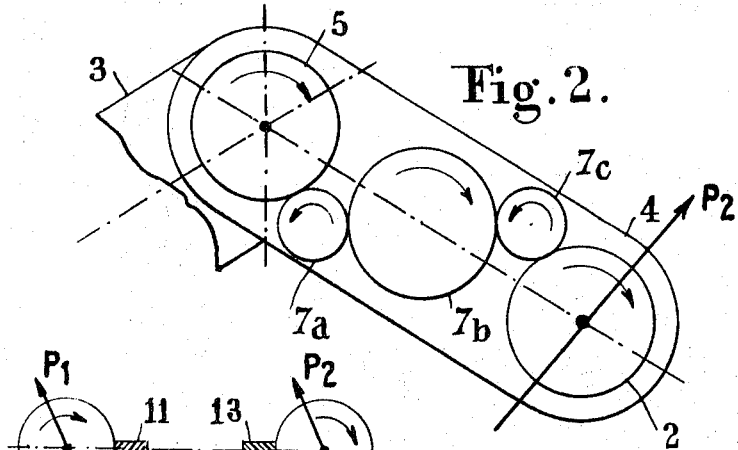
FIG. 2 is a diagram showing another connecting gearing.

In the alternate form of embodiment illustrated diagrammatically in FIG. 2, three inter-meshing pinions 7a, 7b and 7c are substituted for the single intermediate pinion 7 and mounted for rotation on the angularly movable arm 4. Pinion 7a is in meshing engagement with the central wheel 5 and pinion 7c with the external toothed wheel 2. A similar mechanical gearing is provided on the other side between the central wheel 5 and the other toothed wheel 1.

Figure 3:
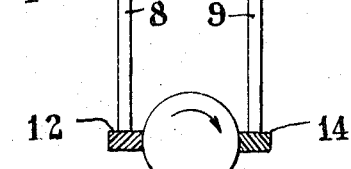
FIG. 3 is a diagram showing another form of embodiment of the mechanical gearing serving the same purpose as those illustrated in FIGS. 1 and 2.

In the case of sighting instruments having relatively long bodies, such as artillery binoculars, the toothed wheels 1, 2 may be rotatably coupled as shown in FIG. 3. In this case control rods 8, 9 transmit the motion between the central wheel 5 and the toothed wheels 1 and 2 respectively. The left-hand rod 8 of FIG. 3 carries at both ends a worm 11, 12 meshing with the toothed wheels 1 and 5 respectively, and the other control rod 9 carries similar worms 13, 14 meshing with the toothed wheels 2 and 5 respectively. In this alternate construction the strict parallelism between the polarization planes $P_1$ and $P_2$ is preserved irrespective of the polarizer adjustment.

Alternately, a link chain may be used to constitute the mechanical transmission between the central wheel 5 and the outer wheels 1 and 2, without departing from the spirit and scope of the invention.

Figure 4:
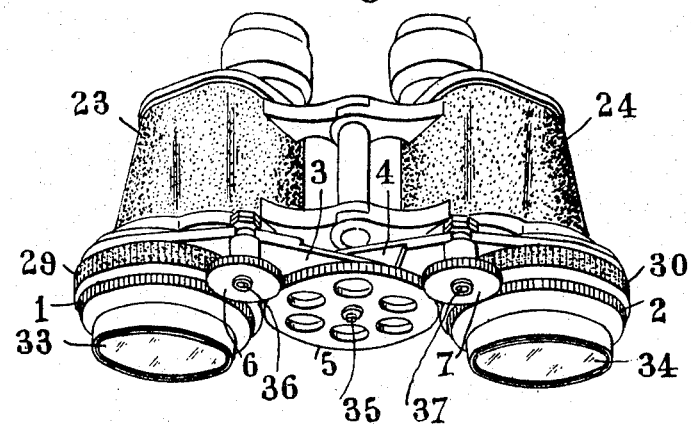
FIG. 4 is a perspective view from beneath showing binoculars equipped according to this invention.

Now reference will be made to FIGS. 4 to 6 of the drawings which show binoculars constructed according to the teachings of this invention.

On the binocular lens systems 21, 22 mounted on the front end of the binocular bodies 23, 24 respectively, flanged rings 25 and 26 are fitted respectively. These flanged rings are formed with shouldered portions adapted to carry the inner race of ball-bearings 27, 28 respectively, of which the outer races are fitted in annular casings 29, 30 having knurled outer peripheral surfaces. These annular casings 29, 30 are formed with shoulders 29a, 30a respectively on which the toothed wheels 1, 2 are secured through any suitable means, for example screws 31 and 32. These shoulders 29a and 30a of annular casings 29 and 30 have collar or like cylindrical extensions 29b, 30b carrying polarizers 33, 34 respectively of which the planes of polarization must remain parallel in all positions, irrespective of the relative spacing of the axes of the binocular bodies 23, 24 and the angular setting of one of these polarizers.

The flanged rings 25 and 26 extend respectively through the arms 3 and 4 pivotally interconnected by a pivot pin 35 on which is also rotatably mounted the central wheel 5 having the same number of teeth as the external toothed wheels 1 and 2. This central wheel 5 is in constant meshing engagement with intermediate pinions 6, 7 rotatably mounted on pins 36 and 37 respectively which are carried by said arms 3 and 4, these pinions 6 and 7 being also in meshing engagement with the outer toothed wheels 1 and 2.

From the foregoing it will be seen that the mechanical transmission or gearing consisting of the toothed wheels 1, 2 intermediate pinions 6, 7 and central wheel 5 permits of maintaining the parallel setting of the polarization planes of polarizers 33 and 34 since the transmission ratio between wheels 1 and 2 is 1:1, irrespective of the relative axial spacing of the binocular bodies 23 and 24.

All the component elements of the mechanical gearing are made preferably from light and rigid materials, whether metallic or not, in order to keep the weight of the assembly within reasonable limits. To this end the weight of the pinion and toothed wheels may be reduced by perforating same.

Upon completion of the preliminary adjustment of the parallel setting of the planes of polarization, any movement of rotation imparted to one of the knurled annular casings 29 or 30 will produce an equal rotation of the other knurled annular casing and therefore the other polarizer in the same direction. On the other hand the mechanical gearing permits of changing the orientation of the polarizers through the smallest angle without any intermediate lost motion or stoppage, and without stop members or dead centers.

Thus, the adjustment of the orientation of the polarization planes of polarizers 33 and 34 may be altered as a function of the plane of polarization of the stray or undesired light to be eliminated, this polarization plane being extremely variable according to the conditions in which the observation is effected. Advantageously, the binoculars according to this invention may be completed with sun visors and if desired the color contrast may be further improved by mounting on these binoculars color filters of which the pass-band is consistent with the observation or sighting conditions (yellow, orange, red, crimson red, etc.).

Now reference will be made to FIGS. 7 to 9 of the drawings which illustrate the application of this invention to a binocular observation instrument wherein the two bodies of the binocular instrument are adapted to be moved in translation towards and away from each other, instead of rotating as in the case of the binoculars shown in FIGS. 4 to 6 and described hereinabove.

The observation instrument illustrated in FIGS. 7 to 9 comprises two binocular bodies 41, 42 on which annular casings 43, 44 are secured through any suitable means such as screws 65 and 66. These annular casings 43, 44 are adapted to receive in their recesses ball-bearings 45, 46 having their inner races rigidly mounted on sleeves 47, 48 in which the polarizers 49 and 50 are fitted.

In FIG. 9 it will be seen that the two ball-bearings 45 and 46 are shifted longitudinally in relation to each other so that when the binocular bodies 41 and 42 are in their position of minimum relative spacing as shown in FIGS. 7 to 9, the annular casings 43 and 44 are somewhat interfitting in the central region of the instrument in order to obtain the shortest possible distance between the axes of the two binocular lens systems.

On the front portion of sleeves 47 and 48 sun visors 51 and 52 may be secured respectively.

To rotate the polarizers 49 and 50 the sleeves 47 and 48 are formed with an external circular set of helical teeth 53 and 54 respectively, which are of same pitch and direction, and have also the same modulus and inclination, so that the movement of rotation applied thereto is positively reversible (this inclination being about 45° to this end). The set of teeth 53 and 54 are rotatably driven through worms 55, 56 having a common axis extending at right angles to the axes of teeth 53 and 54 and which is parallel to the direction of relative translation of the two binocular bodies 41, 42.

The worms 55 and 56 are solid respectively with shafts 57 and 58 rotatably mounted on the strop-forming end portions of the corresponding supports 59 and 60. These supports 59 and 60 are secured respetcively on the annular casings 43, 44 through any suitable means such as screws 61 and 62.

The aforesaid shafts 57 and 58 are rotatably coupled to each other by means of a device 63 permitting their relative axial sliding movement or translation. This device 63 may comprise for instance a square-sectioned rod solid with one of the shafts 57 or 58 and fitted in a female recess of corresponding cross-sectional shape formed in a socket solid with the other shaft.

One of the shafts, in this example shaft 57, is provided with a knurled knob 64.

When the binocular bodies 41 and 42 are moved away from each other this device 63 permits the movement of shafts 57 and 58 away from each other, the toothed rings 53, 54 remain stationary in relation to their axes, as well as the polarizers 49 and 50.

If for a given relative spacing of the binocular bodies 41 and 42 either one of the sleeves 47 or 48 is rotated, or both sleeves, 47 and 48 are rotated simultaneously, by means of the knurled knob 64, the two polarizers 49 and 50 will revolve through the same angle and in the same direction. The operation of the device is continuous, in that it is possible to reverse the position of polarizers 49 and 50 through the smallest angle, without any stoppage, without using any stop member and without any lost motion or dead center position.

With this arrangement a rotation of same angular magnitude in the same direction of both polarizers 49 and 50 is also obtained if the relationship between the pinions 55, 56 on the one hand and toothed wheels 53, 54 on the other hand is such that the rotation of the assembly consisting of shafts 57 and 58 produces two rotational movements of equal angular magnitude and of same direction of both toothed wheels, this requirement being met by simply providing the same transmission or gearing ratio for each pinion and wheel assembly and by maintaining their magnitude and sign reversibility.

Although the present invention has been described in conjunction with preferred embodiments, it is to be understood that modifications and variations may be resorted to without departing from the spirit and scope of the invention, as those skilled in the art will readily understand; such modifications and variations are considered to be within the purview and scope of the invention and appended claims.

What I claim is:

1. A binocular observation and sighting instrument comprising two adjustable binocular bodies, two optical paths with a polarizer interposed in each optical path, two supports rotatably movable about the optical axis of said paths respectively, each of said movable supports having mounted thereon a polarizer, toothed wheels rotatably solid with said supports of said polarizers respectively, and a gearing providing a 1:1 transmission ratio, both in magnitude and sign, for coupling to each other said toothed wheels solid with said supports of said polarizers, and for controlling the rotation of said polarizers while maintaining the polarization planes of said polarizers in a strictly parallel relationship irrespective of the polarizer adjustment and of the relative spacing of the two optical axes of the instrument with a view to increase the luminance contrast between the observed object and the background.

2. An instrument as set forth in claim 1, wherein the binocular bodies are pivotally interconnected about a common pivot pin, which comprises two arms pivotally interconnected about said pivot pin of said binocular bodies and wherein said mechanical gearing comprises a central toothed wheel rotatably mounted about the pivot pin of said arms and at least one intermediate pinion meshing respectively with said central wheel and with one toothed wheel rotatably solid with one of said polarizers, said central toothed wheel and said toothed wheels solid with said two polarizers having the same number of teeth.

3. An instrument as set forth in claim 2, comprising, on each binocular body, an annular casing, a recess formed in said annular casings, a ball-bearing mounted in said recess, and a polarizer support mounted on said ball-bearing, said toothed wheels being secured on said supports respectively.

4. An instrument as set forth in claim 1, wherein said binocular bodies are adapted to be moved by translation in relation to each other, which comprises circular sets of helical teeth carried by said movable supports of said polarizers, a pair of worms meshing each with one of said sets of heilcal teeth, and a device adapted rotatably to couple said worms while permitting their relative axial movements.

5. An instrument as set forth in claim 4, comprising two annular casings carried each by one of said binocular bodies, a recess formed in each casing, a ball-bearing mounted in each recess and having mounted thereon the support of one of said polarizers, and other supports mounted on said annular casings respectively and having rotatably mounted thereon said worms meshing with said circular sets of helical teeth for rotatably driving said polarizers.

6. An instrument as set forth in claim 5, wherein said ball-bearings are disposed in spaced parallel planes to permit a certain relative interfitting of the relevant annular casings in the central portion of the instrument, in the position of minimum relative spacing of the binocular bodies.

7. Instrument as set forth in claim 1, comprising in addition on each optical path a spectral filter adapted to increase the luminance contrast.

References Cited

UNITED STATES PATENTS

| | | | |
|---|---|---|---|
| 2,380,481 | 7/1945 | Tillyer et al. | 88—65 X |
| 2,383,186 | 8/1945 | Glasser | 88—34 |
| 2,988,955 | 6/1961 | Goto et al. | 88—34 |

FOREIGN PATENTS

| | | |
|---|---|---|
| 1,042,265 | 10/1958 | Germany. |
| 1,261,425 | 4/1961 | France. |
| 1,261,423 | 4/1961 | France. |

VERLIN R. PENDEGRASS, Primary Examiner

U.S. Cl. X.R.

350—14